United States Patent [19]

Shimada et al.

[11] Patent Number: 5,159,477
[45] Date of Patent: Oct. 27, 1992

[54] ACTIVE MATRIX DISPLAY DEVICE HAVING ADDITIONAL CAPACITORS CONNECTED TO SWITCHING ELEMENTS AND ADDITIONAL CAPACITOR COMMON LINE

[75] Inventors: Takayuki Shimada; Yasuhiro Matsushima, both of Kashihara; Yutaka Takafuji, Nara, all of Japan

[73] Assignee: Sharp Kabushiki Kaisha, Osaka, Japan

[21] Appl. No.: 615,949

[22] Filed: Nov. 20, 1990

[30] Foreign Application Priority Data

Nov. 22, 1989 [JP]   Japan ................... 1-304402

[51] Int. Cl.⁵ ................... G02F 1/13; H01L 27/01
[52] U.S. Cl. ................... 359/59; 359/54; 359/87; 357/4; 357/23.7
[58] Field of Search ................... 357/23.7, 4, 51; 340/784; 350/333, 332, 334, 336; 359/54, 59, 87, 88

[56] References Cited

U.S. PATENT DOCUMENTS

| | | | |
|---|---|---|---|
| 4,393,380 | 7/1983 | Hosokawa et al. | 340/784 C |
| 4,778,560 | 10/1988 | Takeda et al. | 357/4 |
| 4,839,707 | 6/1989 | Shields | 350/336 |
| 4,938,566 | 7/1990 | Takeda et al. | 350/333 |

FOREIGN PATENT DOCUMENTS

| | | | |
|---|---|---|---|
| 56-39477 | 9/1981 | Japan . | |
| 61-175622 | 8/1986 | Japan | 350/336 |
| 1-167733 | 7/1989 | Japan | 340/784 G |
| 1-180524 | 7/1989 | Japan | 340/784 G |
| 1-277217 | 11/1989 | Japan | 340/784 |
| 1-304402 | 11/1989 | Japan . | |
| 2-64615 | 3/1990 | Japan | 340/784 |
| 2-72392 | 3/1990 | Japan | 340/784 G |

Primary Examiner—Rolf Hille
Assistant Examiner—Minhloan Tran
Attorney, Agent, or Firm—Nixon & Vanderhye

[57] ABSTRACT

An active matrix display device having low resistance additional capacitor common lines and additional capacitors in which each of the additional capacitors has a first electrode connected to a switching element and a second electrode connected to the additional capacitor common line, and the additional capacitor common line is made of the same material as the signal lines, so that the possibility of signal delay on the additional capacitor common lines is reduced.

7 Claims, 7 Drawing Sheets

ACTIVE MATRIX DISPLAY DEVICE HAVING ADDITIONAL CAPACITORS CONNECTED TO SWITCHING ELEMENTS AND ADDITIONAL CAPACITOR COMMON LINE

RELATED APPLICATIONS

This application is related to our commonly assigned U.S. patent application Ser. No. 07/678,077 filed Apr. 2, 1991 entitled "An Active Matrix Display Device" and naming Shimada et al as inventors.

BACKGROUND OF THE INVENTION

1. Field of the Invention

The present invention relates to an active matrix display device having switching elements, such as thin film transistors (hereinafter referred to as "TFT"), and using liquid crystals as a display medium.

1.1 Related Prior Applications

This application is related to commonly assigned U.S. patent application Ser. No. 07/527,191 filed May 23, 1990 by Shimada, Tanaka, Saito and Ujimasa entitled "An Active-Matrix Display Device with Added Capacitance Electrode Wire and Secondary Wire Connected Thereto".

2. Description of the Prior Art

Recently, research on active matrix display devices using liquid crystals or the like as a display medium has been very actively pursued. More particularly, research efforts directed toward the development of liquid crystal displays (hereinafter referred to as "LCD") known as plane displays have been steadily obtaining good results. There are at present two currents of research aimed at development of active matrix type LCD. One is oriented toward the development of an extra large display screen intended for realization of a so-called "wall type television". The other is oriented toward the development of a high-precision display screen. Active matrix type LCD in particular, which are small in size and able to perform a high-precision display function, are very promising in that large demand could be expected for such an LCD for use as a video-camera color view finder.

An IC chip for driving a TFT array is mounted on an active matrix type LCD. In an active matrix type LCD which is of a small size and is designed to perform high-precision display, spacing between adjacent connection terminals is very limited and, therefore, mounting of the IC chip is difficult. With a view to overcoming this difficulty, in a small-sized, high-precision active matrix type LCD, a drive circuit is formed on a substrate having a TFT array formed thereon.

A basic arrangement of an active matrix display device in which a drive circuit and a TFT array are formed on a common substrate is schematically shown in FIG. 7. In this display device, a gate drive circuit 54, a source drive circuit 55, and a TFT array area 53 are formed on a substrate 50. In the TFT array area 53 there are arranged a multiplicity of parallel gate bus lines 51 extending from the gate drive circuit 54. A multiplicity of source bus lines 52 extending from the source drive circuit 55 are arranged in intersecting relation with the gate bus lines 51. Additional capacitor common lines 59 are arranged in parallel to the gate bus lines 51.

A TFT 56, a picture element 57, and an additional capacitor 58 are arranged in a rectangular area defined between each two adjacent source bus lines 52 and each two adjacent gate bus lines 51. A gate electrode of the TFT 56 is connected to one gate bus line 51, and a source electrode thereof is connected to one source bus line 52. A liquid crystal layer is contained between a pixel electrode connected to a drain electrode and a counter electrode on an opposite base to form the picture element 57. The additional capacitor 58 is formed between the TFT 56 and one additional capacitor common line 59. The additional capacitor common line 59 is connected to an electrode with the same potential as the opposed electrodes which constitute the picture element 57.

In this display device, TFTs 56 connected to a gate bus line 51 are turned on by a signal from the gate drive circuit 54. A video signal is sent from the source drive circuit 55 to picture elements 57 through source bus lines 52. Each video signal is retained between the pixel electrode and counter electrode which constitutes each picture element 57 after the relevant TFT 56 has been turned off. In small-size high-precision active matrix type LCD, the area of each picture element is very small and, accordingly, the capacity of a capacitor formed between each pixel electrode and corresponding counter electrode is small. This gives rise to a problem that a video signal cannot be retained for the required period of time. The potential fluctuation of the picture elements due to the potential fluctuation of the bus line is another possible problem. Therefore, in order to compensate for the capacitor deficiency of the capacitor between each pixel electrode and the corresponding counter electrode, additional capacitors 58 are provided in parallel to individual picture elements 57. One electrode of each additional capacitor 58 is connected to the drain electrode of the relevant TFT 56. The other electrode of the additional capacitor 58 must be of the same potential as the relevant counter electrode. Therefore, this electrode is connected to an electrode of the same potential as the counter electrode through the additional capacitor common line 59.

In many such active matrix display devices of the type having drive circuits integrally formed therein, polycrystalline silicon is used for TFT semiconductor layers. One reason is that polycrystalline silicon affords a high degree of electron and hole mobility. Another reason is that the material is useful for making n-type and p-type TFTs and can therefore be advantageously utilized in constructing CMOS.

An active matrix substrate used in the display device of FIG. 7 is shown, by way of example, in plan view in FIG. 4. Sections taken along line V—V and line VI—VI in FIG. 4 are shown respectively in FIGS. 5 and 6. A semiconductor layer 33, and a lower capacitor electrode 46 which one electrode of an additional capacitor 32 (FIG. 6) are integrally pattern-formed on a glass substrate 30. The semiconductor layer 33 and the lower capacitor electrode 46 are both formed of polycrystalline silicon, and the lower capacitor electrode 46 has been subjected to doping by an ion implantation method or otherwise. Therefore, the resistance of the lower capacitor electrode 46 is small. A gate insulation film 49 overlies both the semiconductor layer 33 and the lower capacitor electrode 46.

As shown in FIG. 4, a gate bus line 40 and an additional capacitor common line 44 is laid in parallel relation to the semiconductor layer 33. As can be seen from FIG. 6, the gate bus line 40, as well as the semiconductor layer 33, is formed on the substrate 30, while the additional capacitor common line 44 is formed on the gate insulation film 49. A part of the additional capacitor common line 44 functions as an upper capacitor electrode of the additional capacitor 32. The gate bus line 40 and additional capacitor common line 44 are formed of n+ or p+ polycrystalline silicon from the standpoint of thermal stability in a subsequent heat treating stage. Gate electrodes 42a and 42b are branched from the gate bus line 40 toward two TFTs 31a and 31b respectively. In this example, two TFTs are arranged in series. With the foregoing arrangement it is possible to reduce current leakage from the TFTs.

An interlayer insulation film 47 is formed on and above the substrate 30. On opposite end portions of the semiconductor layer 33 there are formed contact holes 43a and 43b which extend through both the interlayer insulation film 47 and the gate insulation film 49. As shown in FIG. 4, contact holes 43a are provided in such a way that each source bus line 41 extending across gate bus lines 40 runs over the top of the relevant contact holes 43a. Each source bus line 41 is formed larger in width at each portion thereof which is located above a contact hole 43a. A pixel electrode 45 extends on each contact hole 43b. Each source bus line 41 is formed of a low-resistance metal, such as Al, and each pixel electrode 45 is formed of ITO (Indium Tin Oxide). In this way, the source bus line 41 and the semiconductor layer 33 are electrically connected at the contact hole 43a. Similarly, the pixel electrode 45 and the semiconductor layer 33 are electrically connected at the contact hole 43b. A protective film 48 is formed covering the substrate 30. Further, a gate drive circuit and a source drive circuit (both not shown) which are similar to those shown in FIG. 7 are formed on this active matrix substrate.

The display device using this active matrix substrate is driven in the following way. Initially, a gate-ON signal is output from the gate drive circuit sequentially to individual gate bus lines 40. Thereupon, TFTs 31a and 31b connected to the gate bus lines 40 to which the ON signal is applied are turned on simultaneously. In the source drive circuit (not shown) there are provided TFTs in corresponding relation to individual source bus lines 41, each of these TFTs performs switching between each source bus line 41 and an associated video signal line. Such a TFT, known as "an analog switch", has a function to electrically interconnect the source bus line 41 and the associated video line only when a video signal for corresponding picture elements is being sent. After the video signal is written in the source bus line 41 through the analog switch, the analog switch is turned off, and in turn a further video signal is written in another source bus line 41, and so on.

Each written video signal is retained through the utilization of a parasitic capacity of the source bus line 41. This system is known as "a panel sample hold system". If necessary, there may be provided a capacity for supplementing this parasitic capacity. The panel sample hold system has an advantage that it affords reduction of the area of the drive circuits. Each video signal held by the source bus line 41 is written in an associated pixel electrode 45 and additional capacitor electrode 46 through the TFTs 31a and 31b. In this case, a current for supplying a charge corresponding to the video signal flows in the additional capacitor common line 44 opposite to the additional capacitor electrode 46 in which the video signal is written. After video signals are written in all of the source bus lines 41 intersecting one on-condition gate bus line 40, the gate bus line 40 is turned off.

In such an active matrix substrate, there is a reasonably long time after one of the gate bus lines 40 is turned on and before the one gate bus line 40 is turned off and, therefore, in an initially turned-on source bus line 41, enough time is available to write video signals in the pixel electrodes 45 and additional capacitor electrodes 46. However, in a source bus line 41 which is finally turned on, time available before the gate bus line 40 is turned off is so short that the time for writing video signals is considerably limited. Moreover, in the active matrix substrate shown in FIG. 4, the additional capacitor common lines 44 are formed of n+ or p+ polycrystalline silicon and, therefore, the resistance thereof cannot be said to be reasonably small. This gives rise to a problem that there may occur a signal delay on the additional capacitor common line 44, with the result that video signals cannot be written within the limited time, which in turn may cause fluctuations in the potential of signals written in the pixel electrodes 45.

To explain this problem, an equivalent circuit diagram representing one pixel portion is shown in FIG. 8. A capacity $C_{LC}$ enclosing a liquid crystal layer is positioned between a pixel electrode connected to a drain electrode of a TFT and a counter electrode line connected to a counter electrode. The drain electrode of the TFT is connected to an additional capacitor common line through an additional capacitor $C_s$. A capacity $C_{gd}$ is formed between a gate electrode of the TFT and the drain electrode. When a gate-ON signal is sent to a gate bus line of the TFT, the TFT is turned on and a video signal voltage $V_d$ is written in a source bus line. Where the time constant for signal transmission on the additional capacitor common line is $\tau_{cs}$, and time for writing a signal in the pixel electrode is $T_{ON}$, charging of the additional capacitor is insufficient if condition $\tau_{cs} < < T_{ON}$ is not satisfied, with the result that the potential of the pixel electrode fluctuates. Potential $V_d'$ of the pixel electrode which corresponds to actual display condition in which the TFT has been turned off and a reasonably longer time than $\tau_{cs}$ has passed thereafter may be expressed by the following equation (1)

$$V_d' = V_d - \frac{V_g \cdot C_{gd}}{(C_{dg} + C_{LC} + C_S)} - a \qquad (1)$$

where $V_g$ represents the difference between the gate potential at the time when TFT is ON and the gate potential at the time when TFT is OFF: and a is expressed by the following relation and represents potential variation caused due to the fact that the additional capacitor cannot sufficiently be charged during the write time.

$$a = V_d \cdot \exp(-T_{ON}/\tau_{cs}) \cdot \frac{C_s}{(C_{gd} + C_{LC} + C_S)} \qquad (2)$$

In equation (1), the second term represents the variation of the voltage at the pixel electrode due to the voltage fluctuation on the gate bus line which results from the TFT being turned off. In order to attain good fidelity of display according to the written video signal, the values of the second term in equation (1) and of a in equation (2) must be made smaller. In order to decrease the value of the second term in equation (1), it is necessary that the following relation holds:

$$C_{gd} << C_{LC} + C_2 \quad (3)$$

In a high-precision active matrix substrate, pixel electrodes are very small and therefore $C_{LC}$ is small. Therefore, in order to satisfy the conditions of equation (3), an additional capacitor $C_s$ of a certain level or above is required. Since such a higher level of additional capacitor $C_s$ is required, in order to decrease the value of the third term in equation (1), that is, the value of a in equation (2), it is necessary that the following relation should hold:

$$T_{ON} >> \tau_{cs} \quad (4)$$

Especially in a small size, high-precision active matrix substrate wherein drive circuits and TFT array are formed on a common substrate, it is difficult to satisfy the conditions of equation (4). The reasons may be as follows;

(1) A larger number of gate bus lines is involved, so that time allocatable to each gate bus line is shorter.

(2) Whereas, in the driver IC mounting system, video signals are output simultaneously to all source bus lines, the panel sample hold system is such that video signals are output sequentially to individual source bus lines, with the result that the time allowed for writing in a source bus line in which writing is lastly made is much shorter.

(3) In order to avoid a possible decrease in aperture ratio due to the adoption of high-precision display system, it is necessary to reduce the width of individual lines, this results in increased resistance of the additional capacitor common lines, it being thus impracticable to reduce the value of $\tau_{cs}$.

(4) While the number of picture elements is increased, the size of additional capacitor electrode for each picture element cannot be reduced. As a result, the sum of additional capacities connected to one additional capacitor common line becomes grater, it being thus impracticable to reduce the value of $\tau_{cs}$.

As a solution to these problems, it may be conceivable, for example, to connect each additional capacitor common line at both end portions thereof to an electrode of the same potential as a counter electrode. But this cannot be said to be a good solution. A redundant structure is often employed with additional capacitor common lines, but a problem here is that such a redundant structure cannot be well utilized unless the value of $\tau_{cs}$ is reasonably smaller than $T_{ON}$.

SUMMARY OF THE INVENTION

The active matrix display device of this invention, which overcomes the above-discussed and numerous other disadvantages and deficiencies of the prior art, comprises a pair of insulating substrates, pixel electrodes arranged in a matrix pattern on the inner side of one of the pair of substrates, a switching element connected to each pixel electrode, a signal line connected to the switching element for supplying a video signal, an additional capacitor for retaining charge in the pixel electrode, and an additional capacitor common line connected to the additional capacitor, said additional capacitor having a first electrode connected to said switching element and a second electrode connected to the additional capacitor common line, said additional capacitor common line being made of the same material as said signal lines.

In a preferred embodiment, a drive circuit for supplying a video signal to said signal line is formed on the inner side of one of said substrates.

In a preferred embodiment, a video signal is held by the capacity of said signal line.

Alternatively, the active matrix display device of this invention comprises a pair of insulating substrates, pixel electrodes arranged in a matrix pattern on the inner side of one of the pair of substrates, a switching element connected to each pixel electrode, a signal line connected to the switching element for supplying a video signal, an additional capacitor for retaining charge in the pixel electrode, and an additional capacitor common line connected to one electrode of the additional capacitor, said additional capacitor having a first electrode connected to said switching element and a second electrode connected to said additional capacitor common line, said additional capacitor common line being provided in a parallel relation to said signal line.

In a preferred embodiment, a drive circuit for supplying a video signal to said signal line is formed on the inner side of one of said subtrates.

In a preferred embodiment, a video signal is held by the capacity of said signal line.

Thus, the invention described herein makes possible of the objective of providing an active matrix display device having additional capacitor common lines free from the possibility of signal delay.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

In the active matrix display device according to the invention, there is no possibility of signal delay on additional capacitor common lines, because the additional capacitor common lines can be formed of a metallic material of the same resistance value as the signal lines. For example, Al metal has a small sheet resistance of 0.33 ohms with a film thickness of 300 nm, whereas n+ polycrystalline silicon used in the prior art arrangement has a sheet resistance of 50 ohms with a film thickness 500 nm. Because of the fact that the resistance of the additional capacitor common lines is of such a small value, possible signal delay on the additional capacitor common lines is reduced by more than two digits and can be virtually neglected.

In the display device of the invention, additional capacitor common lines are arranged in parallel relation to signal lines. Because of such an arrangement of additional capacitor common lines, the additional capacitor common lines can easily be formed of the same material as the signal lines.

Figure 3:
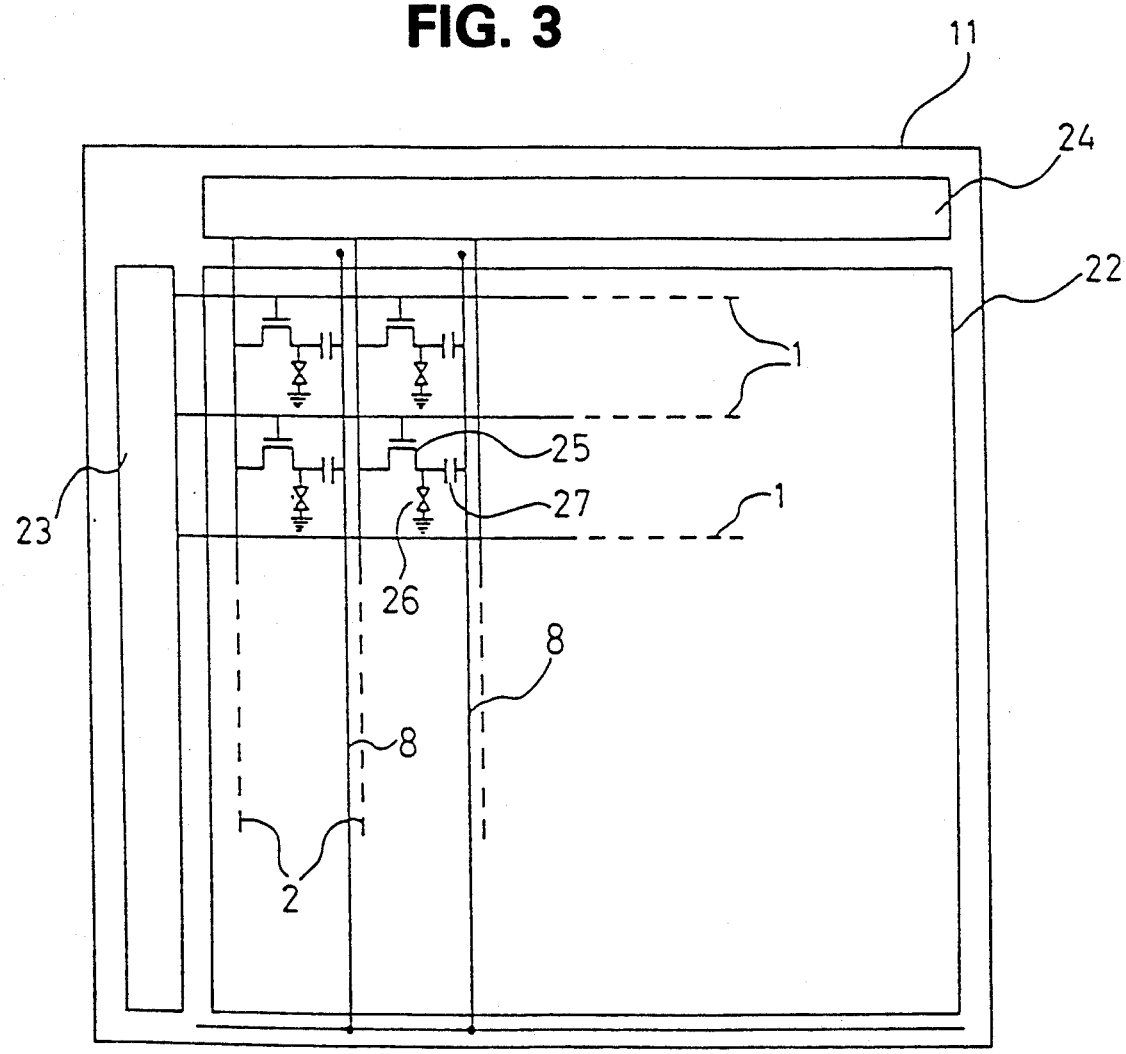
FIG. 3 is a schematic diagram in plan showing a display device using the FIG. 1 substrate.
Figure 4:
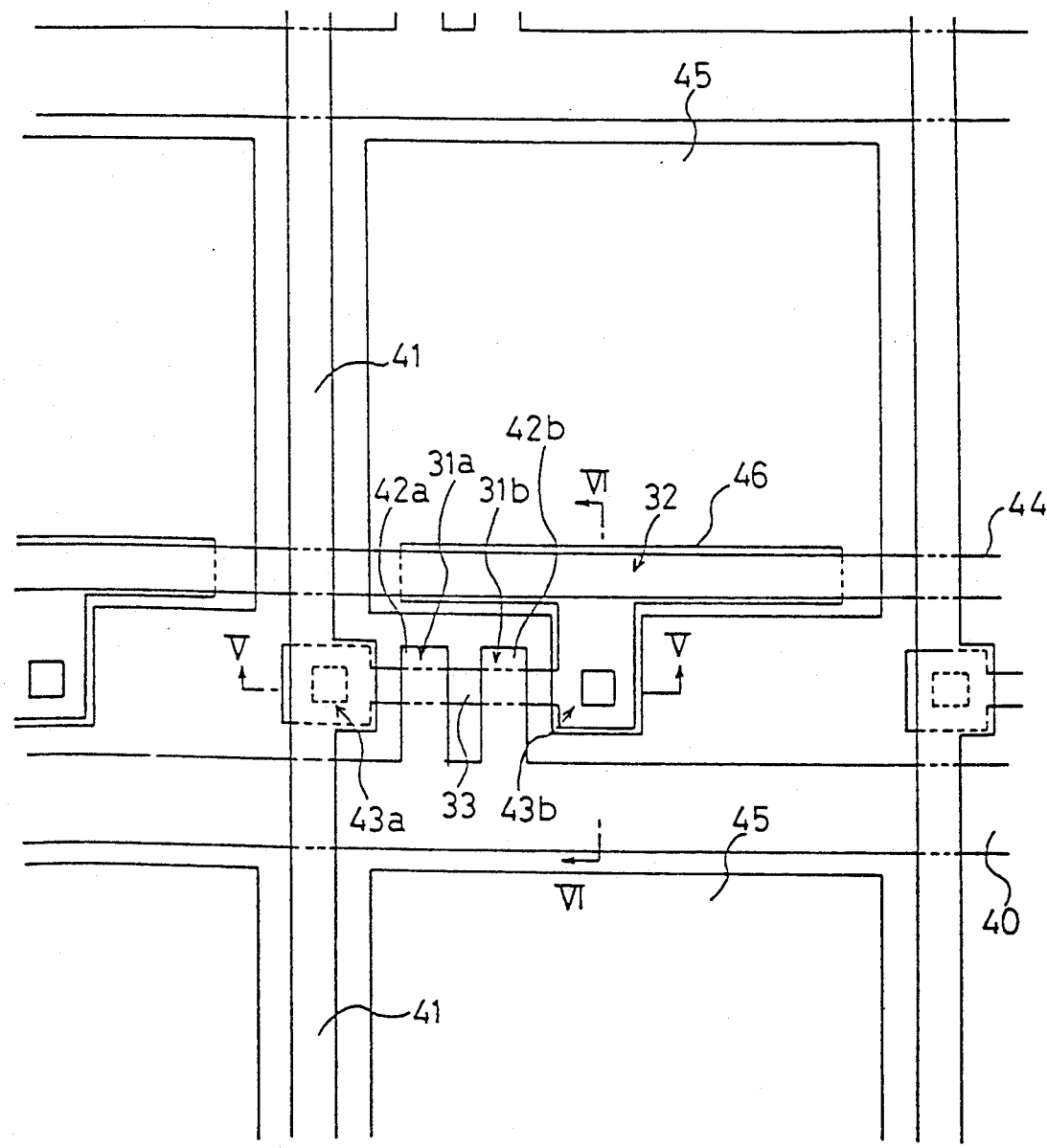
FIG. 4 is a partial view in plan showing a conventional active matrix substrate.
Figure 5:
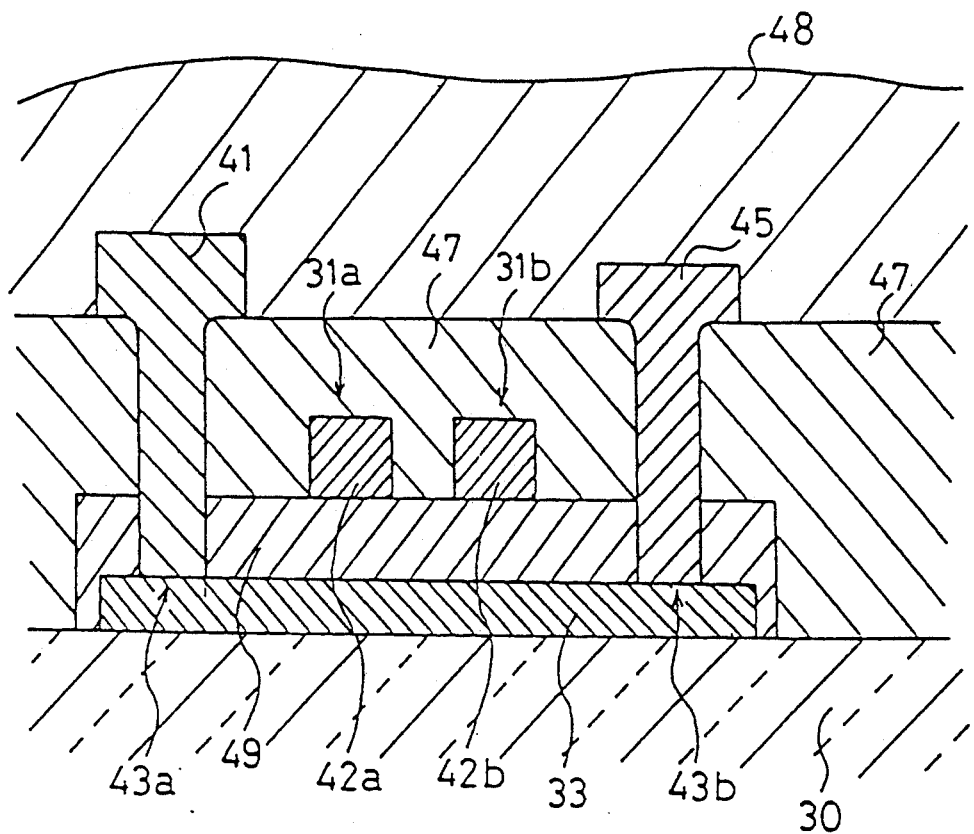
FIGS. 5 and 6 are, respectively, sections taken along line V—V and line VI—VI in FIG. 4.
Figure 6:
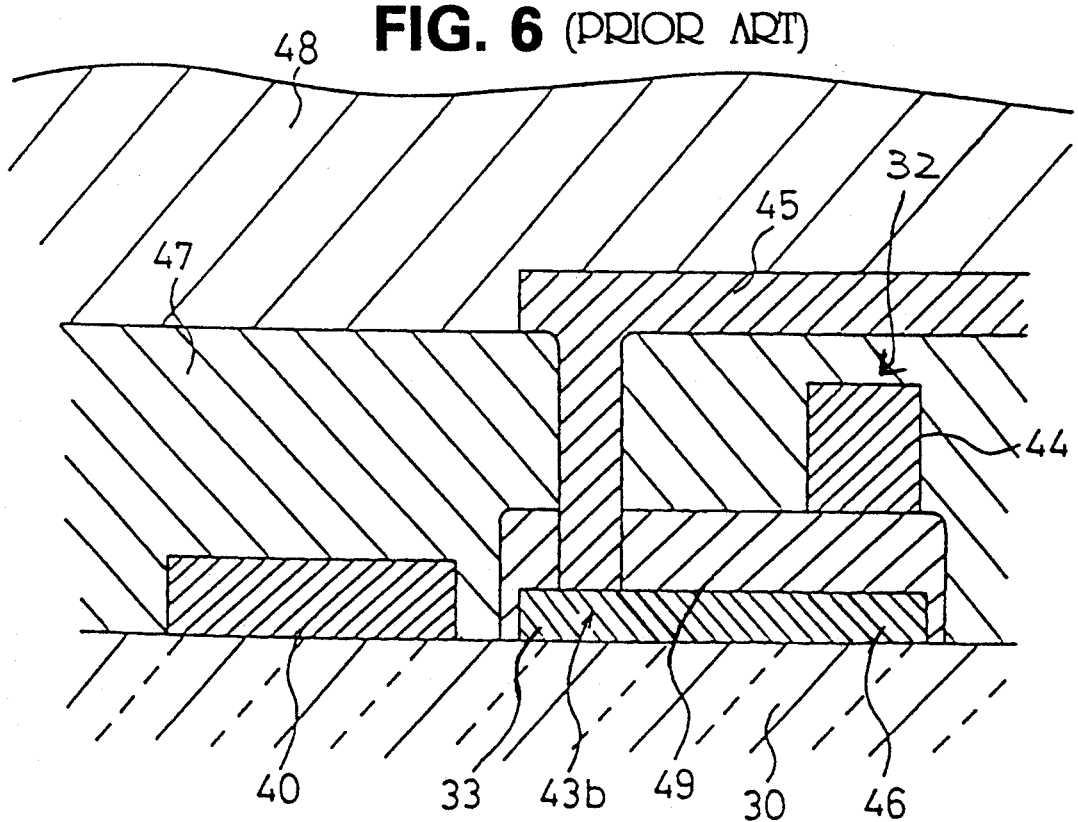
Figure 7:
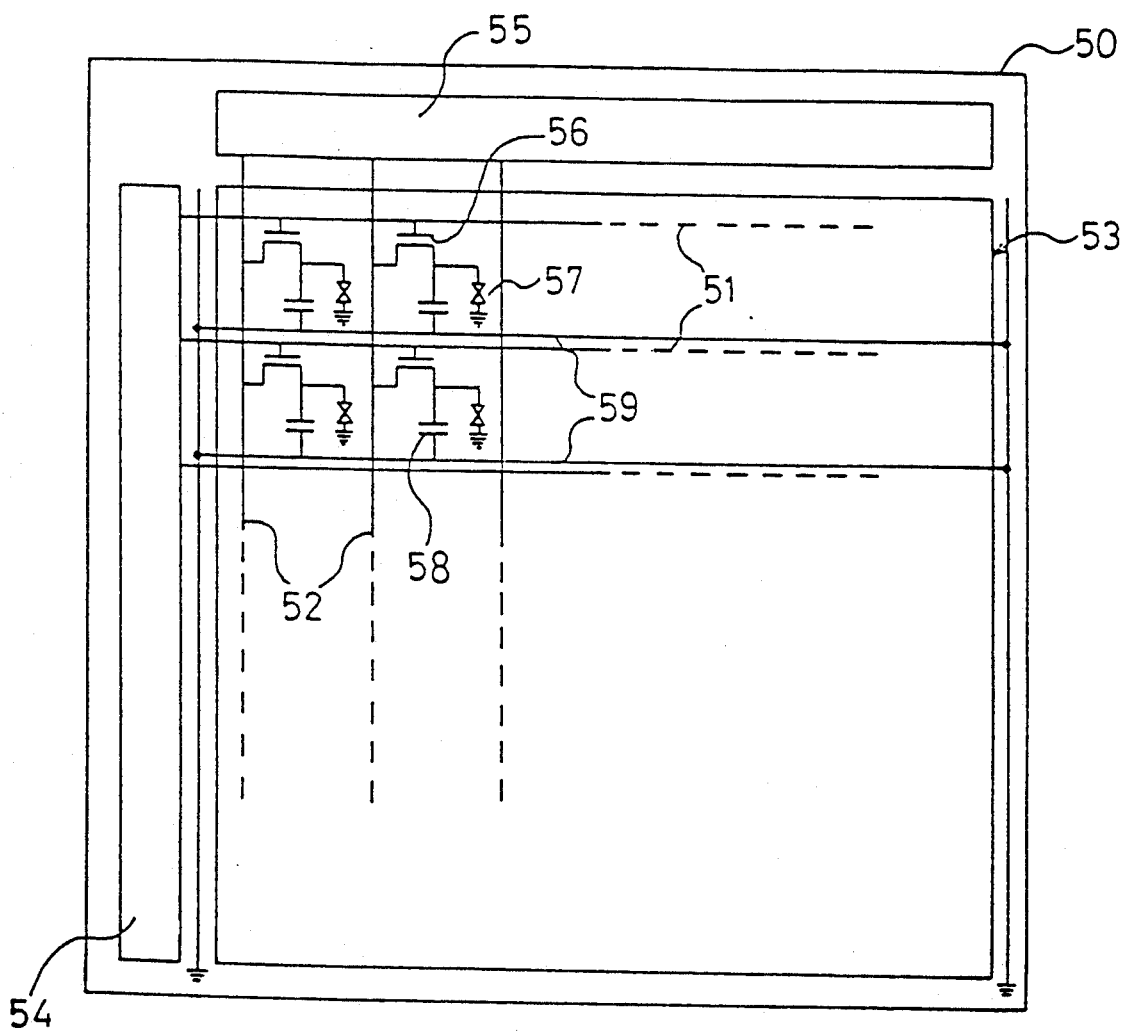
FIG. 7 is a schematic diagram in plan showing a prior art active matrix display device.
Figure 8:
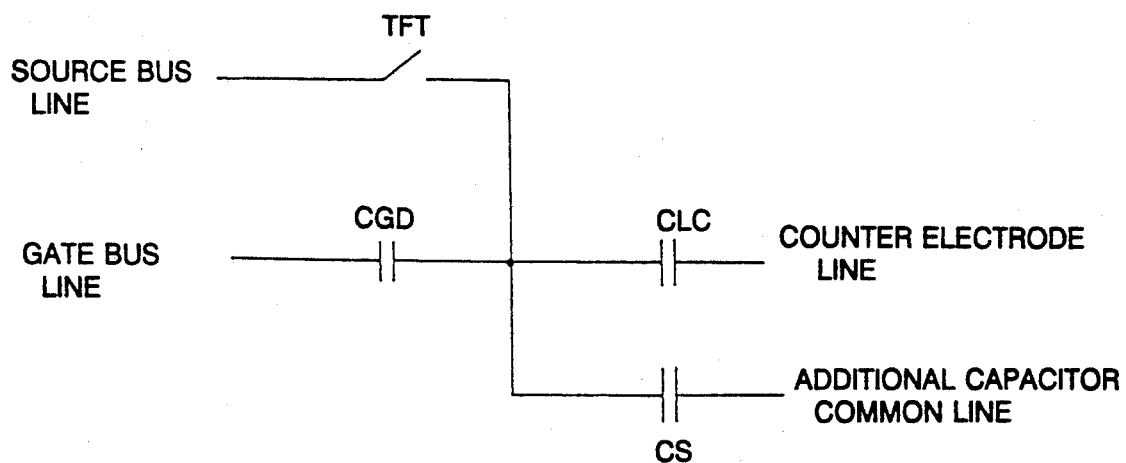
FIG. 8 is an equivalent circuit diagram representing one picture element portion.

One embodiment of the invention will now be described in detail. FIG. 3 is a schematic diagram in plan showing the active matrix display device of the invention. A gate drive circuit 23, a source drive circuit 24, and a TFT array area 22 are formed on a glass substrate 11. A multiplicity of parallel gate bus lines 1 extending from the gate drive circuit 23 are arranged in the TFT array area 22. A multiplicity of source bus lines 2 from the source drive circuit 24 are arranged in an intersecting relation with the gate bus lines 1. In the present embodiment, additional capacitor common lines 8 are arranged in parallel to the source bus lines 2.

Two TFTs 25a and 25b, arranged in series, a picture element 26, and an additional capacitor 27 are arranged in a rectangular region defined by two gate bus lines 1, and one source bus line 2, and one additional capacitor common line 8. In FIG. 3, two TFTs 25a and 25b are shown as one TFT 25 for the sake of simplicity. A gate electrode of the TFT 25 is connected to one gate bus line 1, and a source electrode thereof is connected to one source bus line 2. A liquid crystal layer is sandwiched between a pixel electrode connected to a drain electrode of the TFT 25 and a counter electrode on a counter substrate to form a picture element 26. An additional capacitor 27 is disposed between the TFT 25 and one additional capacitor common line 8. The additional capacitor common lines 8 are electrically connected to an electrode of the same potential as the counter electrode.

Figure 1:
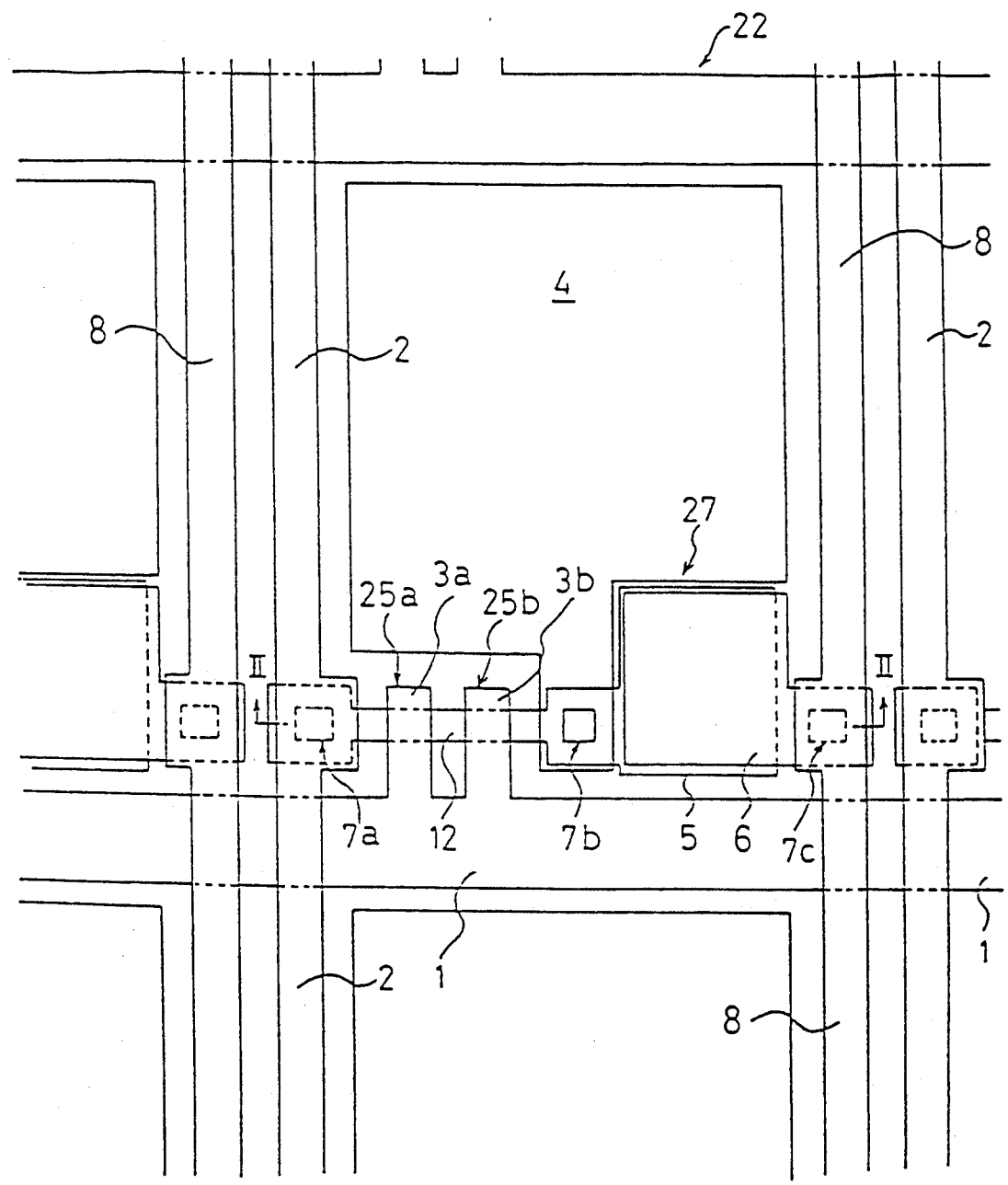
FIG. 1 is a plan view showing a TFT array in an active matrix substrate employed in one embodiment of the active matrix display device according to the invention.
Figure 2:
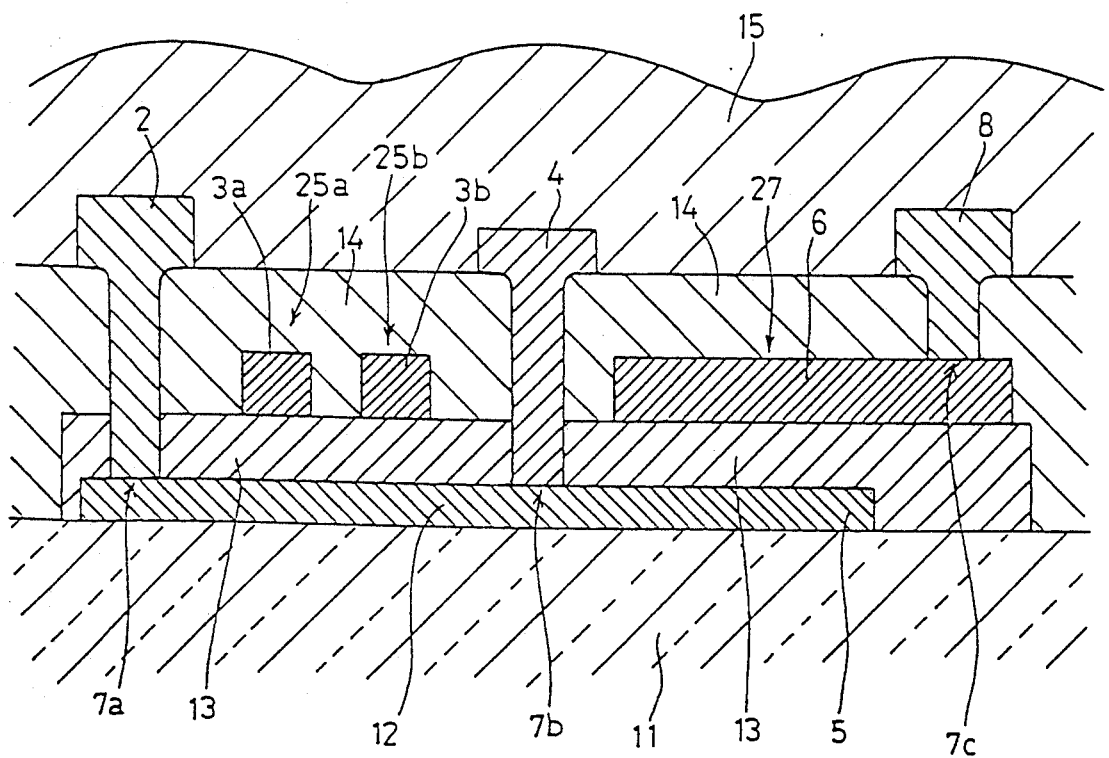
FIG. 2 is a section taken along line II—II in FIG. 1.

The TFT array area 22 illustrated in FIG. 3 is shown in partial plan view in FIG. 1. FIG. 2 is a section taken along line II—II in FIG. 1. The embodiment will be explained according to the process of fabrication thereof with reference to FIGS. 1 and 2. A polycrystalline silicon thin film which will later be formed into a semiconductor layer 12 and a lower capacitor electrode 5 is formed on the entire surface of the above-mentioned glass substrate 11 using the CVD technique. Next, an insulation film which will later be formed into a gate insulation film 13 is formed by the CVD or sputtering technique, or by thermal oxidation of the surface of the polycrystalline silicon thin film. The thickness of the gate insulation film 13 is 100 nm. Then, the polycrystalline silicon thin film and insulation film are subjected to patterning to form the semiconductor layer 12 and lower capacitor electrode 5 of such configuration as shown in FIG. 1. The formation of the gate insulation film 13 may be effected after the semiconductor layer 12 and the lower capacitor electrode 5 are formed. In order to improve the crystallinity of the polycrystalline silicon thin film, it is possible to subject the silicon thin film to laser annealing or annealing in a nitrogen atmosphere, or the like treatment prior to the formation of the insulation film. Next, ion implantation is carried out with respect to the lower capacitor electrode 5 portion and thus a lower capacitor electrode 5 of lower resistance is obtained.

Next, formation of a polycrystalline silicone thin film which is later to be formed into gate bus lines 1, gate electrodes 3a and 3b, and upper capacitor electrodes 6 is carried out using the CVD technique, and the obtained thin film is subjected to doping. Thus, a polycrystalline silicon thin film of low resistance is obtained. The low resistance polycrystalline silicon thin film is then subjected to patterning for formation of gate bus lines 1, two gate electrodes 3a and 3b, and upper capacitor electrodes 6 of such configuration as shown in FIG. 1. An additional capacitor 27 is formed between each upper capacitor electrode 6 and each lower capacitor electrode 5 (FIG. 2). Ion implantation is carried out with respect to the semiconductor layer excepting portions thereof below the gate electrodes 3a and 3b, with the gate electrodes 3a and 3b used as masks and also with a resist formed by photolithography as a mask.

Next, an interlayer insulation film 14 is formed over all the substrate, to the thickness of 700 nm. Three contact holes 7a, 7b, and 7c are formed as shown in FIG. 1. The contact holes 7a and 7b are formed on the semiconductor layer 12 in such a way that they penetrate through the interlayer insulation film 14 and also through the gate insulation film 13. The contact hole 7c is formed on the end portion of the upper capacitor electrode 6 in such a way that it penetrates through the interlayer insulation film 14.

Next, a low resist metallic film of Al or a like material is formed over all the substrate. The metallic film is patterned to form source bus lines 2 and additional capacitor common lines 8 simultaneously. As shown in FIG. 1, each source bus line 2 is so configured that it is larger in width on the contact hole 7a. Likewise, each additional capacitor common line 8 is so configured that it is larger in width on the contact hole 7c. Each source bus line 2 is connected to the semiconductor layer 12 through contact hole 7a, and each additional capacitor common line 8 is connected to the upper capacitor electrode 6 through contact hole 7c. The additional capacitor common lines 8 are each connected to an electrode of the same potential as a counter electrode on the counter substrate after the display device has been completed.

Then, the pattern of pixel electrodes 4 comprised of ITO are formed. As can be seen from FIG. 1, each pixel electrode 4 partially extends to a site above one contact hole 7b. Therefore, the pixel electrode 4 is connected to the semiconductor layer 12 through the contact hole 7b. Further, a protective film 15 is formed over all the substrate.

The display device in the present example is compared with a prior art display device. The results are shown in Table 1. Active matrix subtrates used for comparison are all about 2 inches long in diagonal lines of their display portions and designed to meet clear vision requirements. Additional capacitor common lines are all 4 μm in line width. It is noted, however, that in the prior art substrate, each additional capacitor common line is connected at both ends to an electrode of same potential as the counter electrode. In Table 1, the term "write time" represents a value measured with respect to a picture element for which write time is shortest. As is clearly understood from Table 1, insofar as the display device of the present embodiment is concerned, signal delay, if any, on the additional capacitor common lines is of a completely negligible order.

TABLE 1

|  | Invention | Prior Art |
|---|---|---|
| Additional capacity for one pixel | 0.05 pF | 0.05 pF |
| Add. cap. common line resistance | 2.6 kohms | 500 kohms |
| Add. cap. common line capacity | 23 pF | 36 pF |
| Add. cap. common line time const. | 0.06 μs | 4.5 μs |
| Write time | 6.7 μs | 16 μs |

In the present example, as shown in FIG. 2, the additional capacitor 27 is of such configuration that it, together with the gate insulation film 13, is enclosed by and between the lower capacity electrode 5 formed simultaneously and integrally formed with the semiconductor layer 12 and the upper capacity electrode 6 formed simultaneously with the gate bus lines 1 and gate electrodes 3a and 3b. As earlier stated, the gate insulation film 13 is as thin as 100 nm in striking contrast with the interlayer insulation film 14 which is as thick as 700 nm. Because of this difference, the invention provides an advantage that the area of the electrodes constituting the additional capacities is very small, as compared with additional capacities formed with the interlayer insulation film interposed therebetween. Therefore, according to the arrangement of the present embodiment, it is possible to increase the aperture ratio of the display device.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. An active matrix display device comprising a pair of insulating substrates, pixel electrodes arranged in a matrix pattern on an inner side of one of the pair of substrates, switching elements connected to the respective pixel electrodes, signal lines connected to the respective switching elements for supplying a video signal thereto, at least one additional capacitor for retaining charge in each pixel electrode, and additional capacitor common lines connected to the additional capacitor, said each additional capacitor having a first electrode connected to a drain electrode of said switching element and a second electrode connected to the additional capacitor common line, thereby securing connection between said switching element and the additional capacitor, said each additional capacitor common line being made of the same material as said signal lines.

2. An active matrix display device according to claim 1, wherein a drive circuit for supplying a video signal to said signal line is formed on said inner side of said substrate.

3. An active matrix display device according to claim 2, wherein a video signal is held by the additional capacitor connected to said corresponding signal lines.

4. An active matrix display device comprising a pair of insulating substrates, pixel electrodes arranged in a matrix pattern on an inner side of one of the pair of substrates, switching elements connected to the respective pixel electrodes, signal lines connected to the respective switching elements for supplying a video signal thereto, additional capacitors for retaining charge in each pixel electrode, and additional capacitor common lines connected through contact holes to one electrode of the additional capacitor, said each additional capacitor having a first electrode connected to a drain electrode of said each switching element and a second electrode connected to said each additional capacitor common line so as to secure connection between said each switching element and each additional capacitor, said each additional capacitor common line being provided below each pixel electrode in a parallel relation to said signal line.

5. An active matrix display device according to claim 4, wherein a drive circuit for supplying a video signal to said signal line is formed on said inner side of said substrate.

6. An active matrix display device according to claim 5, wherein a video signal is held by the additional capacitors connected to said corresponding signal lines.

7. An active matrix display device comprising a pair of substrates, pixel electrodes arranged in a matrix pattern on an inner side of one of the pair of substrates, the inner side of the substrate being covered with an insulating layer having a first, second, and third contact holes with respect to each pixel electrode, switching elements connected to the respective pixel electrodes, signal lines connected to the respective switching elements for supplying a video signal thereto, an additional capacitor for retaining charge in the pixel electrode, the additional capacitor being located below the corresponding pixel electrode, a semiconductor layer covered with a gate insulating film and connected to the pixel electrodes and the signal line through the first and second contact holes, and an additional capacitor common line connected to the additional capacitor through the third contact hole;

said each additional capacitor having a first electrode connected to a drain electrode of said switching element and a second electrode connected to the additional capacitor common line, thereby securing connection between said switching element and the additional capacitor, said each additional capacitor common line being made of the same material having a relatively low resistivity as said signal lines so as to avoid a delay of signal transmission.

* * * * *